Dec. 3, 1963 W. R. EDWARDS 3,113,285
WAVE MEASURING APPARATUS
Filed Sept. 27, 1961
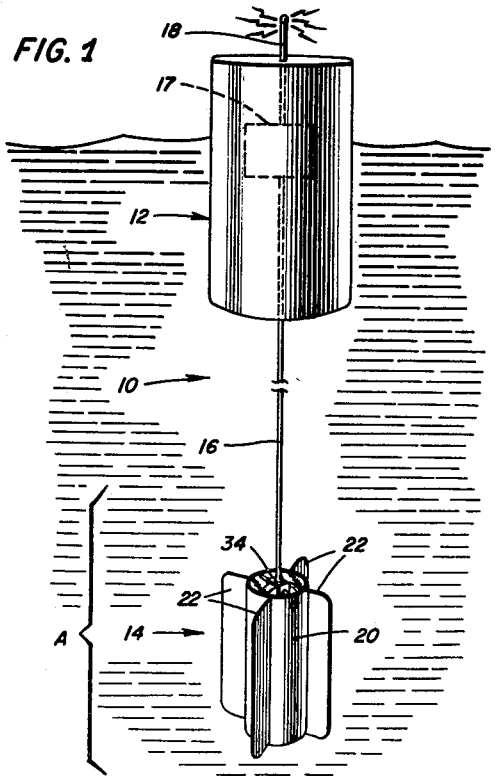
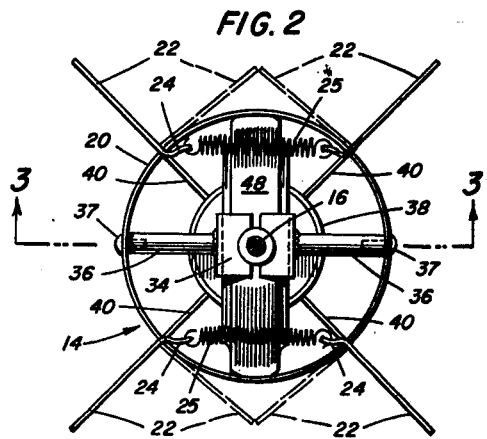
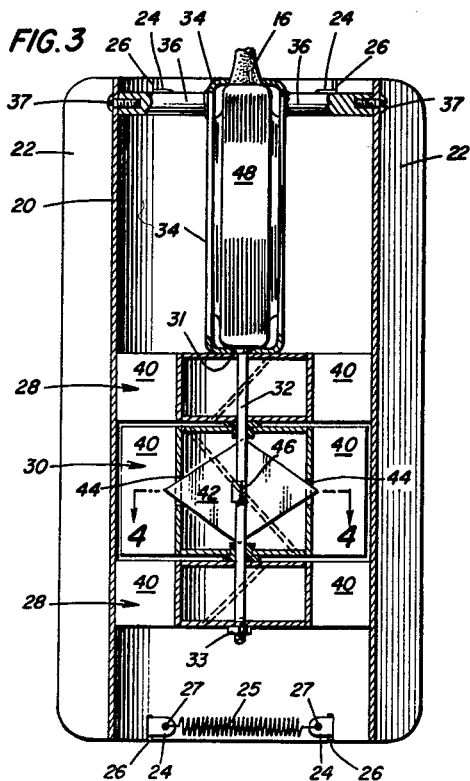
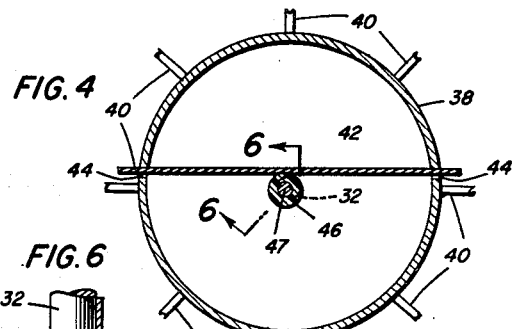
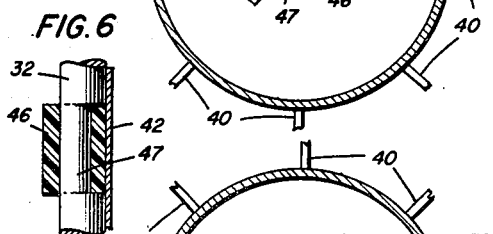
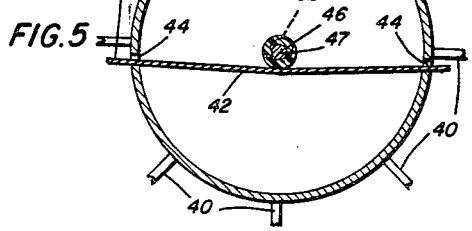
INVENTOR
WILLIAM R. EDWARDS
BY
ATTORNEYS

__

United States Patent Office 3,113,285
Patented Dec. 3, 1963

3,113,285
WAVE MEASURING APPARATUS
William R. Edwards, Box 40, Rte. 2, California, Md.
Filed Sept. 27, 1961, Ser. No. 141,223
4 Claims. (Cl. 340—2)
(Granted under Title 35, U.S. Code (1952), sec. 266)

The invention described herein may be manufactured and used by or for the Government of the United States of America for governmental purposes without the payment of any royalties thereon or therefor.

This invention relates generally to wave measuring devices and more particularly to apparatus of the free-floating type which may be launched in a body of water to ascertain the surface wave geometry.

The situation is often presented where it becomes necessary or desirable to ascertain certain information regarding the height, geometry, and periodicity of waves generated upon the surface of a body of water. Such an occasion arises, for example, where mid-ocean seaplane landings are contemplated, which could lead to most difficult and even disastrous results if naked eye observations of the state of the sea are relied upon, even in the case of the most experienced pilots. Another oftcountered instance where accurately detailed and continuous data as to surface wave patterns is virtually essential is the underwater firing and launching of missiles. Where it is possible to undertake such a measurement from some sort of shore installation or a rig fixed to land or sea bottom, the problem is simplified, but where it becomes necessary to make mid-ocean wave measurements, for example, the problem is presented of providing a stable platform to which such measurements may be related. In the case where wave measuring devices are affixed to shore installations or rigs attached to the ocean bottom, the land itself provides the requisite stable platform, but such devices will not, and were not intended to, answer the problems encountered in taking wave measurements where one is unavoidably isolated from a reference point fixed with relation to land. Prior art devices addressed to this problem are based on widely varying principles and have met with varying success, many of such devices being characterized by their high cost and complexity. There has been a continuing search for a wave measuring device simple and cheap enough to make feasible disposal after a single use, yet of sufficient accuracy to afford the desired information.

It is therefore an object of the instant invention to provide a free-floating arrangement for measuring surface waves at any desired point on a body of water without the necessity of relating such measurements to some point fixed with reference to land.

It is a further object of the present invention to provide an arrangement for measuring surface wave geometry and periodicity, which arrangement inherently provides a stable platform independent of land to which wave measurements may be accurately related.

It is a further object of this invention to provide such an arrangement which is simple in manufacture, yet of high durability, dependability and accuracy.

Yet another object of the instant invention is to provide a wave measuring arrangement which comprehends the employment of presently existing sounding buoys or sonar buoys.

It is still another object of the present invention to provide a combination flow sensing and sound wave generating means for use in an arrangement to measure surface waves upon a body of water, which means is based on well known principles and is of rugged, simple physical embodiment.

Still another object of the present invention is to provide a combination flow sensing and sound wave generating means for use in a surface wave measuring arrangement, which means senses the vertical motion imparted to a buoyant body by surface wave action and which converts this sensation into sound waves which are ultimately radio transmitted to a source of human intelligence.

According to the present invention, the foregoing and other objects are attained by providing an arrangement which is sensitive to the vertical accelerations imparted to a buoyant body floating on the surface of a turbulent body of water, which vertical accelerations actuate an accelerometer-type float sensing means which in turn actuates a sound wave generating means, the output of which may be calibrated to indicate surface wave geometry. A significant feature of this invention is that its concept inherently provides a stable platform for wave measurements wherever the invention is employed by making use of the relatively motionless zone of water found forty or more feet below the wave surface.

In the drawings:

FIG. 1 is a pictorial representation of an embodiment of the invention as it would appear in operation;

FIG. 2 is a top plan view of the combination flow sensing and sound wave generating means shown in the lower portion of FIG. 1;

FIG. 3 is a longitudinal cross section taken on line 3—3 of FIG. 2;

FIG. 4 is a cross section taken on line 4—4 of FIG. 3 with certain parts omitted for clarity;

FIG. 5 is a view similar to FIG. 4 but showing the parts in a different position; and FIG. 6 is a detail of the bearing arrangement taken substantially along line 6—6 of FIG. 4.

Referring now in detail to the drawings wherein like reference numerals designate identical or corresponding parts throughout the several views, and more particularly to FIG. 1 which depicts a possible embodiment of the invention as it would appear in use, the wave measuring apparatus, indicated generally by reference numeral 10, basically comprises a buoyant surface buoy 12 of any desired type and shape, such as the various sonar buoys now in wide use, and a combination flow sensing and sound wave generating means 14 depending therefrom by means of an electrically conductive tension member 16. Housed within surface buoy 12 is a conventional radio transmitter 17 which is electrically connected to tension member 16 and transmitting antenna 18. Tension member 16 is of sufficient length to assure that the combination flow sensing and sound wave generating means 14 will depend from the buoy to a depth of not less than forty feet, thereby assuring that this means will be suspended in a zone of relatively motionless body of water, indicated generally by the bracket labeled A in FIG. 1. This zone A provides the necessary stable platform relative to which accurate wave geometry measurements can be made, as will be further described herein below.

Referring now to FIGS. 2 and 3 for a more detailed description of the combination flow sensing and sound wave generating means 14, there is shown a cylindrical housing 20 having stabilizing fins 22 hingeably mounted along its outer surface and extending longitudinally therealong for substantially the entire length of said housing. The hinged mounting for these fins, as best seen in FIG. 3, comprises tabs 24 integral with said fins and working within notches 26 formed in the wall of said housing. From an inspection of FIGS. 2 and 3, it will be observed that the tabs 24 are so formed as to permit limited swinging of fins 22 from a stowed position, as indicated by the dotted lines in FIG. 2, to an extended, operational position as indicated by solid lines in FIGS. 2 and 3. When the fins are caused to swing into their operative, solid-line position, the configuration of tabs 24 is such that they bear against the inner surface of housing 20 to prevent the fins from swinging beyond that position in which they are radially aligned with the housing axis. As illustrated, each fin is provided with one of such tabs at each of its ends, but additional tabs may obviously be provided intermediate the end tabs for added strength.

In the illustrated embodiment, four stabilizing fins 22 are employed, but the number or shape of such fins is not critical so long as there are even numbers of fins which may be arranged in pairs. Each pair of fins, such as that viewed uppermost in FIG. 2, is interconnected by a tension spring 25 provided at each end of each pair, these springs being anchored within holes 27 formed in tabs 24. Springs 25 urge fins 22 to their extended, solid-line position, but allow the fins to be collapsed to their nested, dotted-line position, as shown in FIG. 2, for stowage purposes. Upon release from stowage, springs 25 automatically urge fins 22 into their operative position, where they will act to minimize any tendency of housing 22 to rotate about its axis, thereby eliminating the possibility of false readings, as will later become apparent.

Within cylindrical housing 20 there is mounted a turbine assembly which may conveniently comprise two stators 28 and a rotor 30 interposed between the two stator stages. The rotor 30 is mounted to freely rotate about non-rotatable shaft 32, which shaft is supported coaxially of the housing and at each end by means of the two stators 28, the shaft being prevented from slipping axially by any suitable means, such as providing the upper end of the shaft, as viewed in FIG. 3, with a flared portion 31 which seats in the bottom of hydrophone stirrup 34 and threading the lower end of the shaft to receive lock nut 33. The upper end of hydrophone stirrup 34 is maintained centrally of housing 22 by means of standoff brackets 36 which are anchored to the housing by screws 37. The rotor stage and stator stages are provided with cylindrical, hollow hub portions 38 having helically curved blades 40 extending radially therefrom. Within the hollow hub portion 38 of rotor stage 30 there is housed a diaphragm 42 composed of a suitable spring-like material, preferably Phosphor bronze or spring steel. This diaphragm may be seated within hub portion 38 by any suitable means, such as notches 44 formed in the wall of the hub portion in such a manner as to cause the diaphragm 42 to assume a position approximating that of a plane passing through the axis of symmetry of housing 20. Mounted on non-rotatable shaft 32 and within hub portion 38 of rotor stage 30 is an eccentrically mounted sleeve bearing 46, shown in greater detail in FIGS. 4 through 6.

Referring now to FIG. 4 there is shown a cross section through the mid-portion of the rotor stage 30, as shown in FIG. 3, with parts omitted for clarity, and showing the essential components of the sound wave generating means. Assuming a flow of liquid through housing 20, rotor 30 will be caused to rotate in accordance with the velocity of such flow, thereby causing integral hub 38 and integrally mounted diaphragm 42 to rotate therewith about non-rotatable shaft 32, upon which shaft is mounted the non-rotatable sleeve bearing 46. As can be seen from an inspection of FIGS. 4 through 6, a cylindrical sleeve-type bearing 46 is mounted over an eccentrically ground portion 47 of shaft 32 to form a cam-like device which is disposed to act against diaphragm 42. As the hub 38 and integrally mounted diaphragm 42 rotate, through the influence of a liquid flow acting upon rotor blades 40, about the eccentrically mounted bearing 46, it is obvious that a cyclic flexure of said diaphragm will be induced and a clicking noise will be produced which is directly proportional to the revolutions of the rotor 30, which revolutions are in turn directly proportional to the water flow through the housing 20.

This clicking sound is picked up by hydrophone 48 and converted to an electrical signal which is transmitted by way of electrically conductive tension member 16 to radio transmitter 17 which transmits by way of antenna 18 to a source of human intelligence for proper interpretation.

In operation, upon launching of the wave measuring device, it will assume the arrangement depicted in FIG. 1. Upon the passage of a surface wave disturbance, buoy 12 will be caused to fluctuate vertically, thereby causing the combination flow sensing and sound wave generating means 14 to also fluctuate vertically. This up and down fluctuation will generate a water flow through the interior of housing 20 rotating the rotor stage 30 at a rate proportional to the speed of fluctuation and through a total number of revolutions proportional to the vertical distance traveled, thereby producing clicking sounds by action of the eccentric sleeve bearing 46 on spring-like diaphragm 42. The total number of clicks observed upon a rise of the buoy may be easily calibrated to indicate the height of the wave disturbance and the rate of clicking will be indicative of the wave profile. That is, the passage of relatively steep waves will produce a sudden increase and decrease in the rate of clicking, whereas a gently swelling wave will produce a more uniform clicking. It is therefore clear that, by the proper use of the instant invention, valuable information as to the wave characteristics existing at a given time and place may be easily and economically ascertained with a proven high degree of accuracy by merely launching the invention from an aircraft, ship, or submarine and recording the transmitted data.

Though the flow sensing means and sound wave generating means have been illustrated as contained within a common housing, it is contemplated such means may be separately housed. Also, it is not essential to the practice of this invention that the flow sensing means be structurally attached to the hydrophone. For example, it is contemplated that the unit designated 14 in FIG. 1 may be suspending from a buoy separate from that which suspends the hydrophone 48, the only limitation being that unit 14 be in sufficient proximity to the hydrophone as to allow the latter to detect signals generated by the former.

Obviously many modifications and variations of the present invention are possible in the light of the above teachings. It is therefore to be understood that within the scope of the appended claims the invention may be practiced otherwise than as specifically described.

What is claimed is:

1. A wave measuring apparatus for determining the height and the profile characteristics of surface waves generated upon a body of water comprising, means buoyant with respect to said body of water, radio transmitting means housed within said buoyant means, a tubular body depending from and supported by said buoyant means, hydrophone means mounted within said tubular body and depending from said buoyant means and electrically connected to said radio transmitting means, stirrup means carried by said body for mounting the hydrophone thereing, flow sensing means rotatably supported within said body adjacent said hydrophone means, a shaft fixed to said stirrup for rotatably supporting said flow sensing means, flexible sound wave generating means carried by and rotatable with said flow sensing means for producing sound waves as the generating means is flexed and unflexed, cam means carried by and fixed to said shaft for flexing the generating means as the generating means rotates with respect to the cam means, said sound waves being picked up and converted to electrical signals by said hydrophone means, which electrical signals are then supplied as an input to said radio transmitting means.

2. A wave measuring apparatus for determining the height and the profile characteristics of surface waves generated upon a body of water comprising, buoyant means, radio transmitting means housed within said buoyant means, hydrophone means depending from said buoyant means and electrically connected to said radio transmitting means, flow sensing means depending from said hydrophone means adjacent thereto, said sensing means including a tubular casing having a pair of fixed stators and a rotor mounted therebetween and a flexible sound wave generating means mounted on said rotor and rotated therewith to produce sound waves as the generating means is flexed, fixed cam means for flexing said generating means as the generating means is rotated with respect to said cam means, whereby, upon passage of a surface wave, said buoyant means is caused to rise and fall, generating a flow of water through said tubular casing and stators, thereby rotating said sound wave generating means and producing said sound waves, which sound waves are picked up and converted to electrical signals by said hydrophone means, which electrical signals are then supplied as an input to said radio transmitting means.

3. A combination flow sensing and sound generating means for use in ascertaining surface wave geometry, said means comprising a cylindrical housing having a nonrotatable shaft coaxially mounted therein, a turbine assembly mounted on said shaft, said turbine assembly comprising at least two stators and one rotor interposed between said stators, said rotor and stators having hollow, cylindrical hub portions concentrically mounted on said shaft, helically curved blades extending radially from said hub portions, a flexible metallic diaphragm extending diametrically across the interior of the rotor hub portion and having the terminal end thereof mounted in slots formed in the rotor hub to allow flexing and unflexing of the diaphragm, a cylindrical sleeve eccentrically mounted on said shaft and with respect to said rotor and in bearing engagement with said diaphragm thereby producing a clicking sound, a sound pick-up device supported within said housing, a substantially O-shaped stirrup carried by said shaft for supporting said sound pick-up device within the housing in proximate relation with respect to the flexible diaphragm.

4. A combination flow sensing and sound generating means as set forth in claim 3 wherein said cylindrical housing is provided with stabilizing fins mounted exteriorly thereof and extending longitudinally therewith for substantially the full length thereof, said fins being hingeably mounted to assume a nested position in proximate relation with respect to the exterior surface of said housing when the latter is in stowage, said hinge mounting comprising a plurality of tabs carried by said fins and extending through complementary slots formed in the cylindrical housing and into the interior of the housing and having springs disposed therebetween and attached thereto to cause said fins to assume an extended, operative position when said housing is released from stowage.

References Cited in the file of this patent
UNITED STATES PATENTS

| | | |
|---|---|---|
| 582,874 | Price | May 18, 1897 |
| 842,327 | Mundy et al. | Jan. 29, 1907 |
| 873,917 | Willson | Dec. 17, 1907 |
| 2,821,924 | Hansen et al. | Feb. 4, 1958 |
| 2,869,108 | Smith | Jan. 13, 1959 |

OTHER REFERENCES

Soviet Union, 125,491, published in Biulleten Izobretenii, No. 1, 1960.